Nov. 22, 1966     J. R. ESPERSON     3,286,487
PROPELLER SHAFTS FOR MOTOR VEHICLES AND OTHER PURPOSES
Filed Dec. 14, 1964
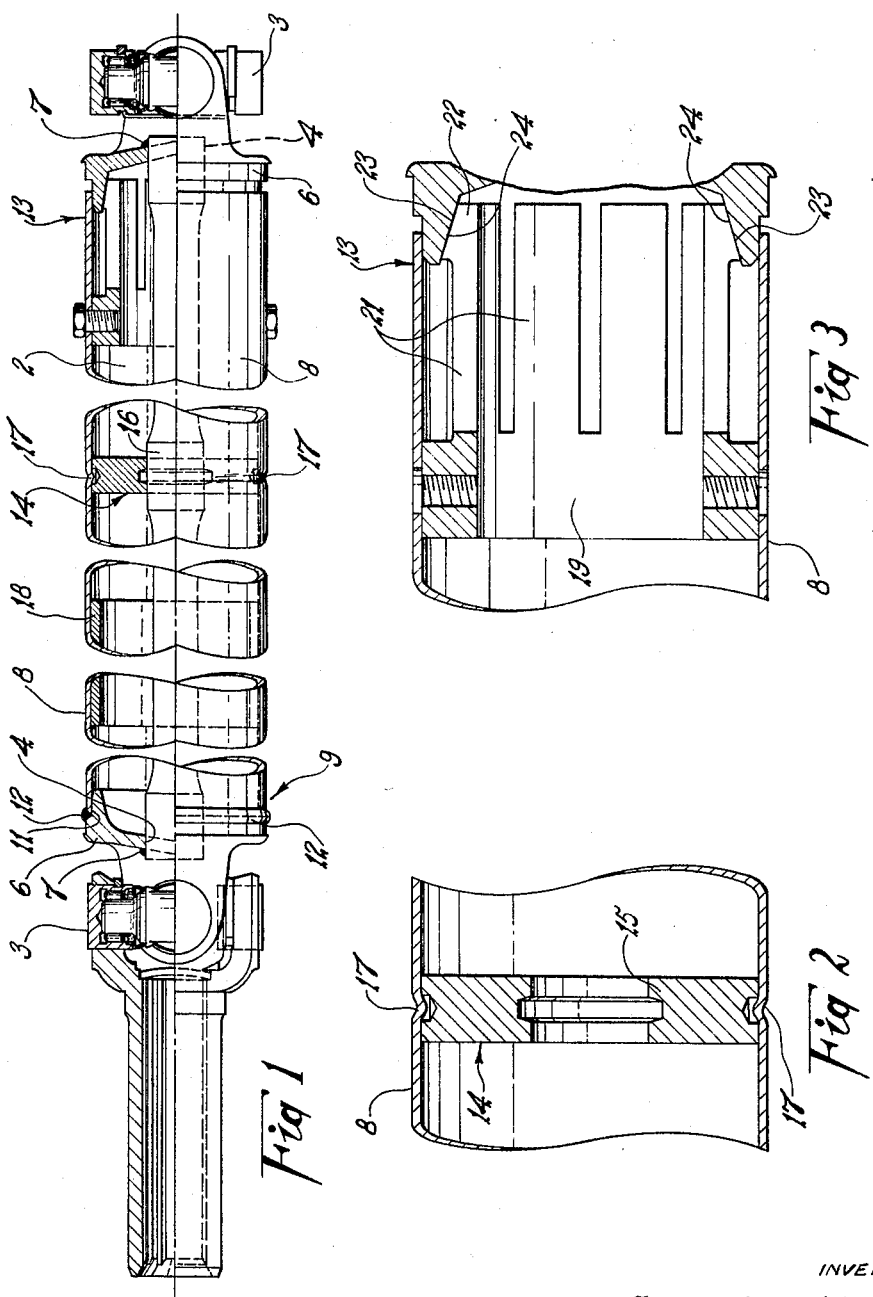
INVENTOR
James Ronald Esperson
BY
J. L. Carpenter
ATTORNEY

United States Patent Office 3,286,487
Patented Nov. 22, 1966

3,286,487
PROPELLER SHAFTS FOR MOTOR VEHICLES
AND OTHER PURPOSES
James Ronald Esperson, Vermont, Victoria, Australia, assignor to General Motors Corporation, Detroit, Mich., a corporation of Delaware
Filed Dec. 14, 1964, Ser. No. 418,054
Claims priority, application Australia, Dec. 13, 1963, 38,805/63
3 Claims. (Cl. 64—1)

This invention relates to propeller shafts for motor vehicles and other purposes and primarily concerns that type of propeller shaft which is connected at its opposite ends to longitudinally spaced universal joints for transmitting the drive from an engine at the front of a vehicle to rear driving wheels.

Such propeller shafts are usually of tubular formation and although this type has been in use for very many years past it is now, in some cases, not proving to be entirely satisfactory due to progressive improvements in automobile engines and the resultant increased power output which is available and frequently causes an undesirable resonant vibration period to develop within a particular speed range. The elimination of such resonant vibrations has presented quite a problem to automobile engineers.

The primary object of the present invention is to provide an improved propeller shaft for the purpose indicated which is designed to materially reduce the tendency of undesirable resonant vibrations to develop as aforesaid by introducing increased torsional resiliency into the improved propeller shaft and consequently into the whole of the mechanism transmitting power from the engine to the driving wheels of the vehicle.

A propeller shaft in accordance with the present invention comprising a solid central driving shaft fixedly connected at its opposite ends to flanges or other movable parts of said spaced universal joints, a tubular casing housing said driving shaft and which is also mounted upon said flanges or other movable parts of the universal joints so as to be substantially concentric with said driving shaft, one end of said casing being fixed to its universal joint component and the other end of the casing being mounted upon its universal joint component in such a manner that it is capable of limited torsional and other movement in relation thereto, said casing being of predetermined diameter so that its wall is spaced from the driving shaft and has a thickness sufficient to ensure that it is substantially rigid when in use whereby said casing maintains the rectilinear form of the driving shaft but does not transmit any power from the engine and the assembly functions to prevent or minimise undesirable resonant periodic vibrations developing whilst the propeller shaft is in use.

Referring to the drawings which form part of this specification:

FIGURE 1 is a part sectional side elevation of a propeller shaft in accordance with the present invention.

FIGURE 2 is a fragmentary sectional elevation on an enlarged scale showing an intermediate bearing.

FIGURE 3 is a sectional elevation on an enlarged scale showing the rear end portion of the propeller shaft fitted with damping means, parts being omitted for convenience of illustration.

In accordance with the present invention, the improved propeller shaft includes a central driving shaft 2 of solid circular formation in cross section and preferably of substantially cylindrical form throughout its length. This central shaft is fixedly connected in any suitable manner at its opposite ends to the related parts of a pair of spaced universal joints 3. For example, the opposite end portions of the central shaft may be adapted to form a push fit in axial sockets 4 or the like in the flanges 6, 6a of the universal joints after which they may be secured in position by welding as at 7.

Associated with the central shaft is a tubular casing 8 which is of predetermined thickness so as to ensure that it is substantially rigid or inflexible when in use. Its diameter is larger than that of the central shaft. For example, the overall diameter of the tubular casing may be of the order of three times that of the central driving shaft.

This casing is also adapted for mounting upon the yoke flanges 6 of the spaced universal joints in such a manner that when secured in position the casing is substantially concentric with the central shaft.

One end of the casing, such for example as the forward end 9 thereof, is fixedly secured to its related yoke flange and for this purpose, the latter may be provided with a stepped shoulder 11 on which the end portion of the tubular casing may form a close push fit after which it may be retained in position by welding 12.

The opposite or rear end portion 13 of the tubular casing is mounted upon its related yoke flange 6 in such a manner that it is capable of limited relative torsional and other movement in relation thereto. This mounting also preferably includes sealing means for opposing loss of lubricant from within the casing and the undesirable admission of foreign matter.

It is also desirable to ensure that the central shaft and its casing remain substantially straight and coaxial when in use. For this purpose, one or more intermediate bearings 14 may be provided between the shaft and the inner surface of the casing. For example, each such intermediate bearing may consist of a collar 15 freely encircling a bearing surface 16 on the driving shaft, the collar being secured in the desired operative position within the casing for example by staking as at 17 or in any other suitable manner.

If desired the casing 8 may be provided with a sleeve like lining 18 which forms a tight fit within the casing and is composed of chip board or any other suitable type of sound absorbing material.

It will be appreciated from the foregoing that when in use, the inherent torsional resilience of the solid central driving shaft 2 neutralises or absorbs torsional vibrations from the engine whilst the slidable engagement between the free end 13 of the tubular casing 8 and its universal joint yoke flange 6 provides for limited rotational movement between the central driving shaft and its tubular casing and of any possible axal movement between these two members.

Although such limited relative movement is permissible between the central driving shaft and its coaxial tubular casing it will be appreciated that these parts are adapted to co-operate when in use in such a manner as to effectively oppose undesirable whip motion developing in the drive shaft by ensuring that the shaft and its casing remain substantially straight and coaxial at all times.

If desired, additional friction damping may be introduced by fixing within the free end portion 13 of the tubular casing a circular or other clamping member having a series of circumferentially spaced and laterally projecting spring fingers 21. Each of these fingers is provided at its outer end with a head piece 22 having an inclined face 23 adapted to form a sliding fit with a complementary inclined face 24 on the adjacent yoke flange of the universal joint.

Instead of employing one or more intermediate bearings as aforesaid, the space between the central shaft and its tubular casing may be filled with foamed plastic material which is preferably foamed in situ.

Alternatively, the intermediate bearing or bearings 14 may be formed of moulded rubber bonded for example, to inner and outer steel shells which are pressed into position inside the tube and onto the driving shaft.

It is to be understood that all metal-to-metal sliding surfaces may be lubricated with graphite or molybdenum disulphide to provide so called "permanent" lubrication at such locations.

The improved resilient propeller shaft is of relatively simple design and inexpensive construction and effectively prevents, or at least minimizes, undesirable resonant periodic vibrations of the type before mentioned.

Various minor alterations, modifications and/or additions may be introduced into the foregoing construction and arrangement of parts without departing from the ambit of the invention as defined by the appended claims.

Having now described my invention, what I claim as new and desire to secure by Letters Patent is:

1. A propeller shaft adapted for use in motor vehicles and comprising
   a pair of spaced flanges adapted to be connected with with separate portions of a power train,
   a central shaft having its opposite ends connected to said flanges so as to be capable of transmitting torque therebetween, said shaft being torsionally resilient so as to minimize the transfer of undesirable torsional vibrations between said flanges,
   a tubular casing concentrically surrounding said shaft, said casing being mounted on and extending between said flanges so as to maintain them in alignment, said casing being rotatably fixed with respect to one of said flanges and capable of at least limited rotatable movement with respect to the other of said flanges and
   friction damping means carried on said casing and frictionally contacting said other flange whereby to assist in damping out torsional vibrations transmitted to said propeller shaft.

2. A propeller shaft as defined by claim 1 and further comprising at least one bearing member carried by said casing intermediate said flanges and supporting said central shaft within said casing while permitting relative rotational motion of said casing and shaft.

3. A propeller shaft as defined in claim 2 wherein said flanges include axially extending annular shoulders, said casing being supported on said shoulders and secured to said one flange by welding, said frictional damping means comprising a ring member secured internally of said casing and having a plurality of axially extending resilient fingers frictionally engaging an inner surface of said other flange.

References Cited by the Examiner
UNITED STATES PATENTS

| | | | |
|---|---|---|---|
| 1,664,713 | 4/1928 | Strickland | 64—1 |
| 1,716,284 | 6/1929 | Risley | 64—1 |
| 1,965,742 | 7/1934 | Junkers | 64—1 |
| 2,751,765 | 6/1956 | Rowland et al. | 64—1 |

FOREIGN PATENTS 674,293   6/1952   Great Britain.

FRED C. MATTERN, Jr., *Primary Examiner.*

HALL C. COE, *Examiner.*